US010606622B1

(12) United States Patent
Totale et al.

(10) Patent No.: US 10,606,622 B1
(45) Date of Patent: Mar. 31, 2020

(54) METHOD AND SYSTEM FOR WEB APPLICATION LOCALIZATION USING HIERARCHICAL RESOLUTION

(71) Applicant: EMC Corporation, Hopkinton, MA (US)

(72) Inventors: Sachin Gopaldas Totale, Pleasanton, CA (US); Vikas D. Kulkarni, Bangalore (IN); Pawel T. Zieminski, Pleasanton, CA (US); Himawan Soedarsono, Fremont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 37 days.

(21) Appl. No.: 15/198,975

(22) Filed: Jun. 30, 2016

(51) Int. Cl.
G06F 9/451 (2018.01)
G06F 8/60 (2018.01)

(52) U.S. Cl.
CPC ............... *G06F 9/454* (2018.02); *G06F 8/60* (2013.01)

(58) Field of Classification Search
None
See application file for complete search history.

(56) References Cited

U.S. PATENT DOCUMENTS

| 6,519,647 | B1 * | 2/2003 | Howard | H04L 63/0823 |
| | | | | 709/203 |
| 7,660,902 | B2 * | 2/2010 | Graham | G06F 21/6245 |
| | | | | 709/203 |
| 8,463,815 | B1 * | 6/2013 | Zoellner | G06F 16/164 |
| | | | | 707/783 |
| 8,516,449 | B2 * | 8/2013 | Artzi | G06F 11/3604 |
| | | | | 717/124 |
| 8,627,442 | B2 * | 1/2014 | Ji | H04L 63/0245 |
| | | | | 726/11 |
| 8,943,478 | B2 * | 1/2015 | Artzi | G06F 11/3672 |
| | | | | 717/127 |
| 8,965,925 | B2 * | 2/2015 | Zoellner | G06F 16/164 |
| | | | | 707/781 |
| 9,237,130 | B2 * | 1/2016 | Ji | H04L 63/0245 |
| 9,262,158 | B2 * | 2/2016 | Amodio | G06F 8/38 |
| 9,396,342 | B2 * | 7/2016 | Bakthavachalam | G06F 21/604 |
| 9,471,553 | B2 * | 10/2016 | Ligman | G06F 17/2247 |
| 10,079,831 | B1 * | 9/2018 | Totale | G06F 21/629 |
| 10,083,324 | B1 * | 9/2018 | Totale | H04L 63/102 |
| 2006/0259949 | A1 * | 11/2006 | Schaefer | H04L 63/0428 |
| | | | | 726/1 |

(Continued)

OTHER PUBLICATIONS

Parr, Terence. "Web application internationalization and localization in action." Proceedings of the 6th international conference on Web engineering. ACM, 2006. (Year: 2006).*

(Continued)

*Primary Examiner* — Matthew J Brophy
(74) *Attorney, Agent, or Firm* — Chamberlain, Hrdlicka, White, Williams & Aughtry

(57) ABSTRACT

In general, in one aspect, the invention relates to a method for processing requests from client devices. The method includes receiving, from a client device, a request for an entity associated with a web application, where the request is associated with a user, making a first determination, by traversing a logical application hierarchy of the web application, that the user is permitted to view the entity, and based on the first determination, providing the entity to the client device.

15 Claims, 8 Drawing Sheets

(56) References Cited

U.S. PATENT DOCUMENTS

| | | | | |
|---|---|---|---|---|
| 2006/0294194 A1* | 12/2006 | Graveline | ............ | H04L 63/0227 709/217 |
| 2007/0011650 A1* | 1/2007 | Hage | ......................... | G06F 8/38 717/104 |
| 2007/0214497 A1* | 9/2007 | Montgomery | ...... | G06F 21/6218 726/4 |
| 2008/0066002 A1* | 3/2008 | Nauerz | ................. | G06F 3/0482 715/762 |
| 2009/0240935 A1* | 9/2009 | Shukla | ................ | G06F 9/44505 713/100 |
| 2009/0254572 A1* | 10/2009 | Redlich | ................. | G06Q 10/06 |
| 2010/0192201 A1* | 7/2010 | Shinnoni | ................ | G06F 21/55 726/3 |
| 2012/0179987 A1* | 7/2012 | Mohan | ...................... | G06F 8/38 715/762 |
| 2012/0304275 A1* | 11/2012 | Ji | ......................... | H04L 63/0245 726/11 |
| 2013/0019314 A1* | 1/2013 | Ji | ............................ | H04L 67/02 726/25 |
| 2014/0012805 A1* | 1/2014 | Zoellner | ............... | G06F 16/164 707/609 |
| 2014/0196141 A1* | 7/2014 | Ji | ........................ | H04L 63/0245 726/14 |
| 2014/0366110 A1* | 12/2014 | Huhn | ...................... | H04L 63/08 726/7 |
| 2015/0100600 A1* | 4/2015 | McGee | ............... | G06F 9/44505 707/770 |
| 2016/0087939 A1* | 3/2016 | Ji | ........................ | H04L 63/0245 726/11 |
| 2016/0142868 A1* | 5/2016 | Kulkarni | .................. | H01Q 1/24 455/456.5 |
| 2017/0053221 A1* | 2/2017 | Trenciansky | .......... | G06Q 10/00 |
| 2017/0104747 A1* | 4/2017 | Huhn | ...................... | H04L 63/08 |
| 2017/0193221 A1* | 7/2017 | Liu | ......................... | G06F 21/53 |

OTHER PUBLICATIONS

Choi, Dae-Young. "Personalized local internet in the location-based mobile web search." Decision support systems 43.1 (2007): 31-45. (Year: 2007).*

* cited by examiner

METHOD AND SYSTEM FOR WEB APPLICATION LOCALIZATION USING HIERARCHICAL RESOLUTION

BACKGROUND

A network is a set of interconnected computing devices that may communicate with each other. Web applications are applications that are developed for the network that includes a series of web pages. Each web page may include various user interface components, e.g., buttons, etc.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description In the following description of FIGS. 1A-5, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or place of the embodiments described with regard to a corresponding like-named component in any other figure.

In general, embodiments of the technology relate to a method and system for displaying entities of a web application. More specifically, embodiments of the technology relate to a method and system that determines whether a given entity may be displayed for a particular user of the web application, where the determination is based, at least in part, on hierarchical level qualifiers. Further, if the user is permitted to view the entity that she requested, embodiments of the technology determine what type of localization to apply to the entity based, at least in part, on the localization configuration(s) associated with the logical application hierarchy.

Figure 1A:
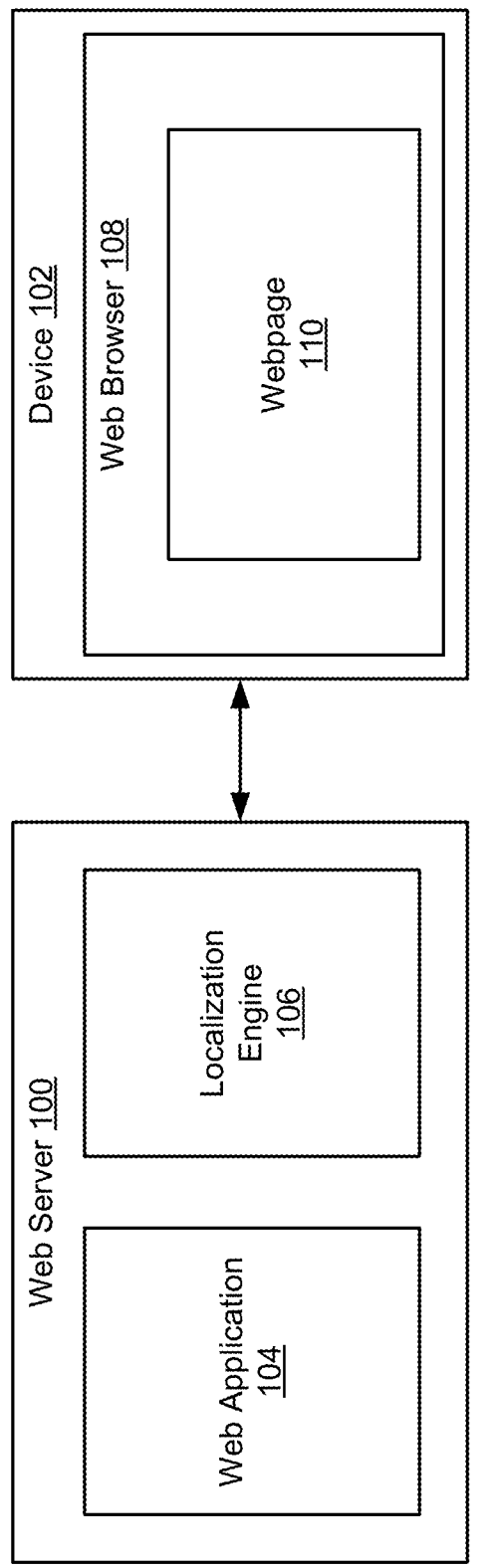
FIGS. 1A-1B show example systems in accordance with one or more embodiments of the technology.

FIG. 1A shows a system in accordance with one or more embodiments of the technology. The system includes a web server (100) and a device (102). Each of these components is described below.

In one embodiment of the technology, a web server (100) is a computing system (e.g., a computing system described in FIG. 4) that includes functionality to host a web application (104) and to execute a localization engine (106).

In one embodiment of the technology, a web application (104) refers to an application that is implemented by a web server. The web application includes a series of webpages and logic that is used to: (i) perform various actions on the webpages and (ii) transition between webpages. The end user may interact with the web application via a web browser (108) on a device (102). The logic associated with the web application (typically in the form of executable code) may be performed by the web server, the device, or any combination thereof. Further, the logic associated with the web application may also enable the web server to communicate with other web servers or any other devices (or servers) (not shown).

Continuing with the discussion of FIG. 1A, hosting the web application (104) may include storing the necessary files for the web application including source code (e.g., HTML files, JavaScript, CSS files, etc.), images, third-party libraries, etc. and then executing the web application (i.e., providing the requested files to the device (102)). Executing the web application may include receiving HTTP requests from a device (102), processing the HTTP request, generating an HTTP response based on the processing of the HTTP request, and providing the HTTP response to the device.

In one embodiment of the technology, the web server (100) may communicate (e.g., send and receive HTTP requests) with one or more end user devices (102) (e.g., the computing systems in FIG. 4) over any wired network, wireless network, or any combination thereof. In one embodiment of the technology, the devices each include at least one web browser (108) that permits the device to display webpages (110) (provided with HTTP responses) to the end users. The web browser (108) may also include functionality to execute computer code (e.g., JavaScript, etc).

In one embodiment of the technology, the web server uses the functionality of the localization engine (106) in order to service requests for entities issued by the user (e.g., via the web browser). More specifically, the localization engine (106) includes functionality to determine which entities may be viewed by a user (via a web browser) and the localization to apply to any such entities prior to such entities being displayed for the user (via the web browser). Additional detail about the functionality of the localization engine is described in FIGS. 3A-3B.

Figure 1B:
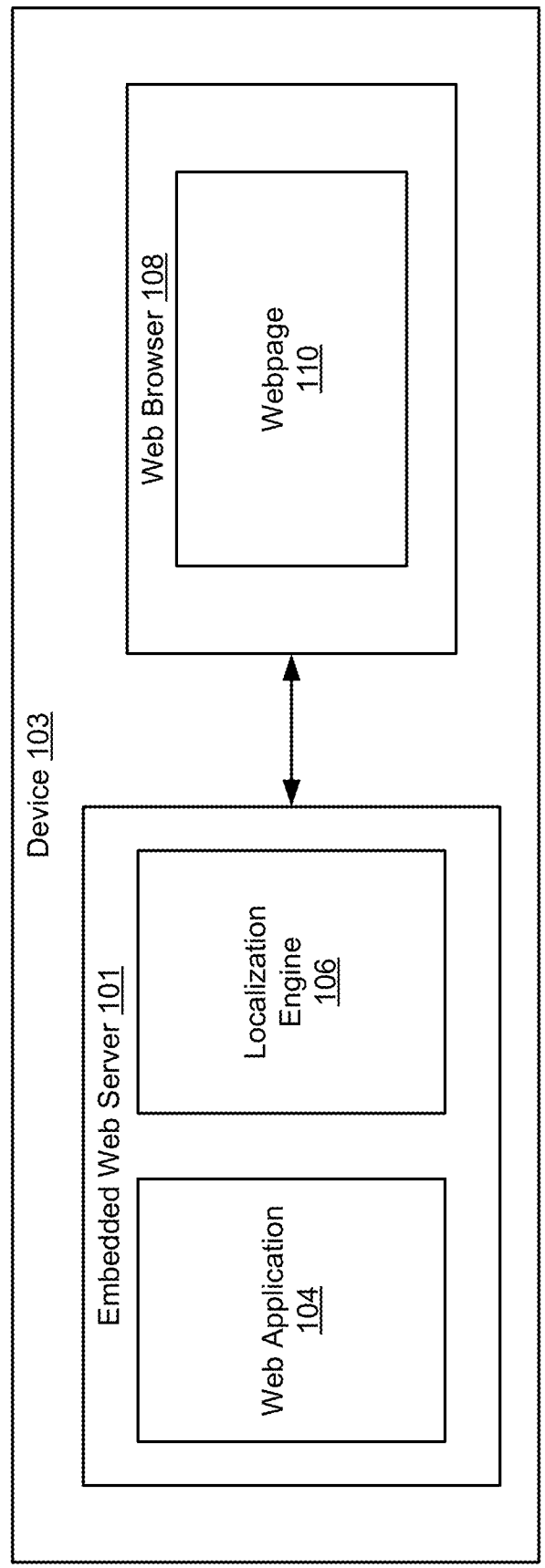

FIG. 1B shows another system in accordance with one or more embodiments of the technology. The system includes a device (103), where the device includes an embedded web server (101) and a web browser (108). The device may be any computing system (e.g., the computing system described in FIG. 4). In this embodiment, the device (103) hosts an embedded web server (101), which includes substantially the same functionality as the web server (100) shown in FIG. 1A. Further, the web browser (108) within the device (103) interacts with the embedded web server in substantially the same manner as the web browser interacts with the web server shown in FIG. 1A.

The technology is not limited to the system configurations shown in FIGS. 1A-1B. Further, while FIGS. 1A-1B shows single instances of various system components, those skilled in the art will appreciate that the system may be multiple instances of one or more system components without departing from the technology.

Figure 2A:
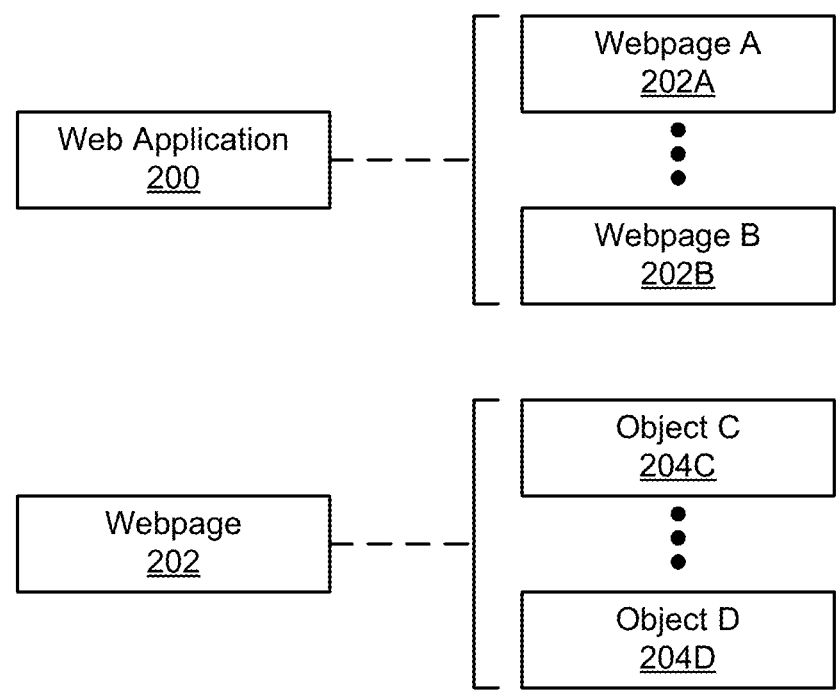
FIGS. 2A and 2C show the relationships between various components in the example system in accordance with one or more embodiments of the technology.

FIG. 2A shows the relationship between various components in the system in accordance with one or more embodiment of the technology.

In one embodiment of the technology, from the perspective of a user that is interacting with the web application via a web browser, each web application (200) includes one or more webpages (202A, 202B). Further, each webpage (202) includes one or more objects (i.e., visible components) (204C, 204D). Examples of objects include, but are not limited to, buttons, labels, menus, context menus, radio buttons, input fields, tables, and text boxes. In one embodiment of the technology, an object is a component on a webpage that may: (i) trigger an action; (ii) obtain input from a user for an action; and/or (iii) display output to a user (via the webpage). In one embodiment of the technology, each object may also include be a complex object, where the complex object includes two or more objects (which may or may not be complex objects).

Figure 2B:
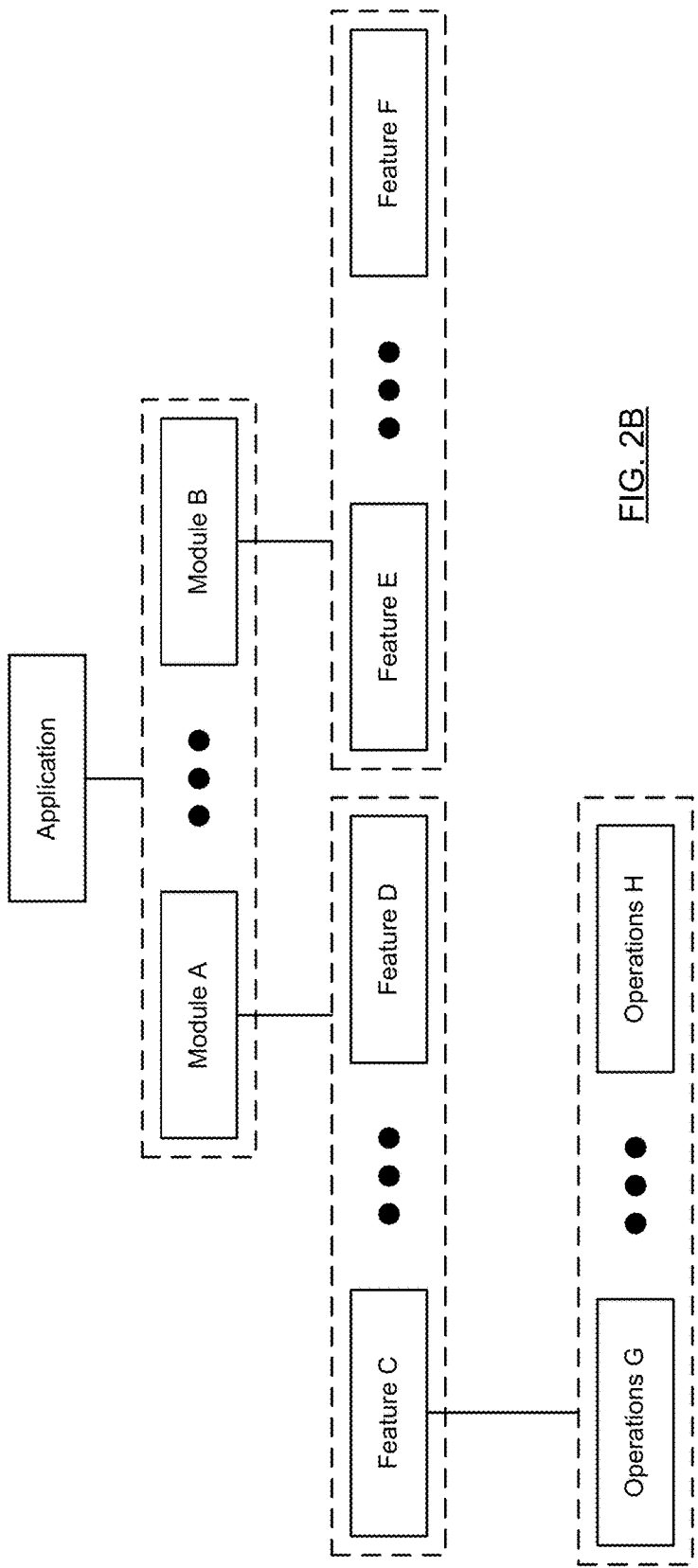
FIG. 2B shows an example logical application hierarchy in the example system in accordance with one or more embodiments of the technology.

Referring to FIG. 2B, in one embodiment of the technology, each web application may be represented as a logical application hierarchy, which corresponds to the logical structure of the web application from the perspective of the web server. More specifically, the logical application hierarchy may correspond to the organization of the various components of the web application (e.g., HTML files, JavaScript, CSS files, images, third-party libraries, etc.) within, for example, a file structure (see e.g., FIG. 5). The logical application hierarchy may include any number of hierarchical levels. For example, in FIG. 2B, the logical application hierarchy includes four hierarchical levels (i.e., level 1: application, level 2: modules; level 3: features; and level 4: operations).

Figure 2C:
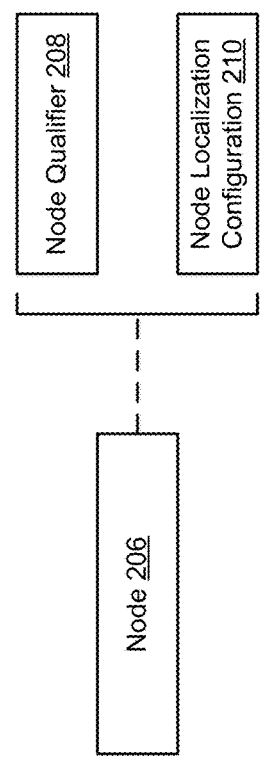

In one embodiment of the technology, at each hierarchical level, there may be one or more nodes. For example, referring to FIG. 2B, in level 2 of the logical application hierarchy there is a node for each of the modules (i.e., module A, module B). If the logical application hierarchy corresponds the file structure, then each of the nodes may correspond to a folder in the file structure (see e.g., FIG. 5, 500, 502, 504, 506, 508, 510). Referring to FIG. 2C, each node (206) optionally includes a node qualifier (208) and/or a node localization configuration (210).

The node qualifier (206) specifies one or more attributes that are used to determine whether a particular user may view entities associated with the node. In one embodiment of the technology, an entity in a web application may correspond to a webpage, a set of webpages, a complex object, or an object. An entity may be deemed to be associated with a node, if the source code, images, and/or third-party libraries for the entity are stored in the node or stored in a child-node of the node (i.e., any node at a lower hierarchical level than the node that is directly or indirectly connected to the node).

In one embodiment of the invention, the attributes may include, but are not limited to, role(s) (e.g., admin, developer, finance, etc.), user(s) (e.g., user IDs), tenant(s) (e.g., company or legal entity name), subscription(s), geographic location(s), device type(s), application version(s), and license number(s). The set of attributes listed in the node qualifier for a given node may be referred to as the scope of the node qualifier. In one embodiment of the technology, the scope of the node qualifier for each node in the logical application hierarchy is equal to or greater than the node qualifier for any of its child nodes.

In one embodiment of the technology, the node (206) may be associated with a node localization configuration (210). The node localization configuration, if present, may include a set of localization entries. Each localization entry specifies, e.g.: (i) an entity (e.g., using an entity ID), and (ii) a localization qualifier (e.g., one or more attributes), and (iii) the localization content (i.e., the content to display with/in the particular entity). The localization content may specify a particular language (e.g., English, French, Spanish, etc.) and/or specify different content. Said another way, localization is not limited to translations of content from one language to another; rather, localization may also include providing different content (which may or may not be translated) (e.g., a different label on a table, a different layout of content, etc.).

Figure 5:
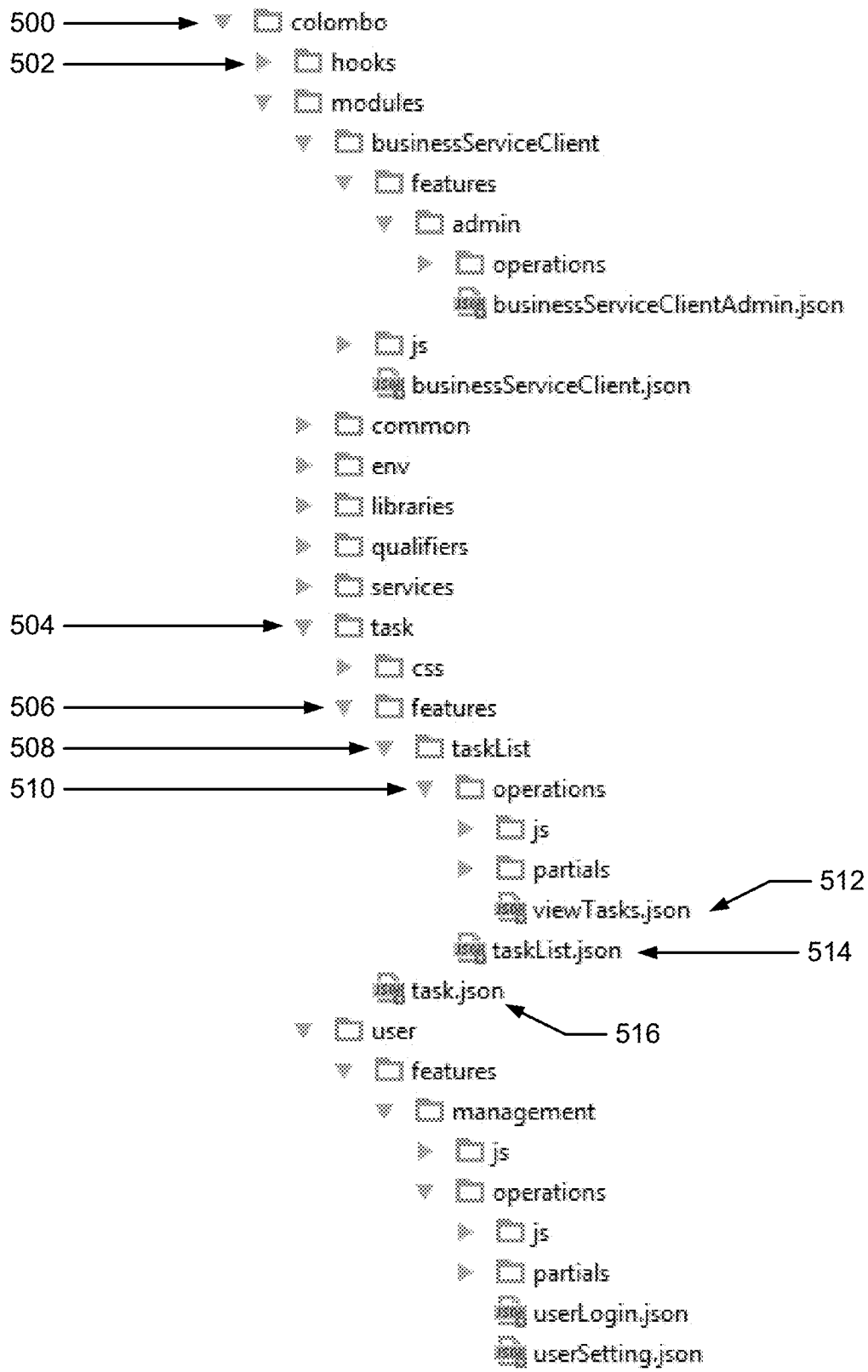
FIG. 5 shows an example in accordance with one or more embodiments of the technology.

In one embodiment of the technology, the node qualifier and the node localization, if both present for a given node, may be stored in the same or different files associated with the node (see e.g., FIG. 5).

Figure 3A:
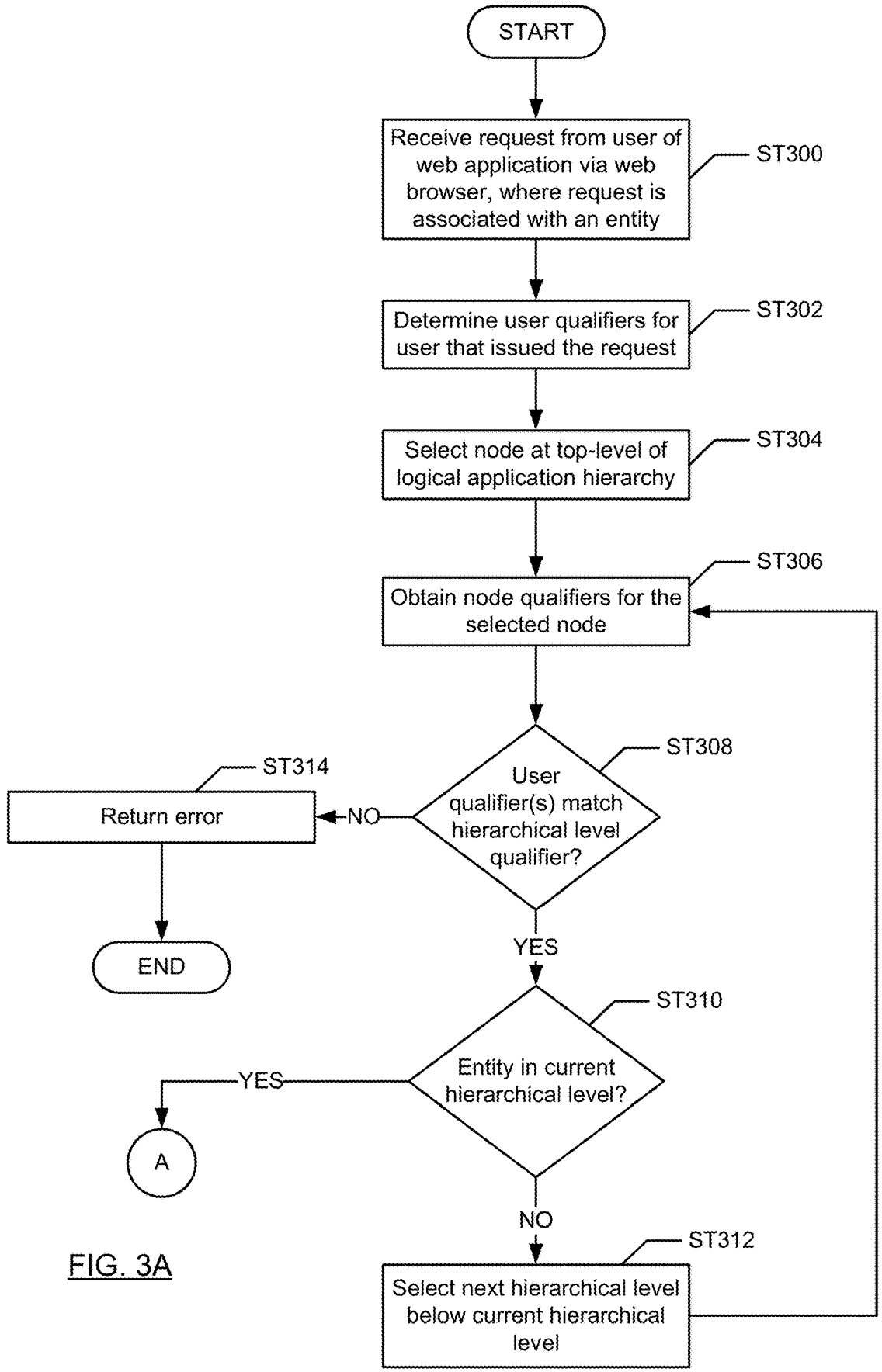
FIGS. 3A-3B shows a method for displaying a webpage to a user in accordance with one or more example embodiments of the technology.
Figure 3B:
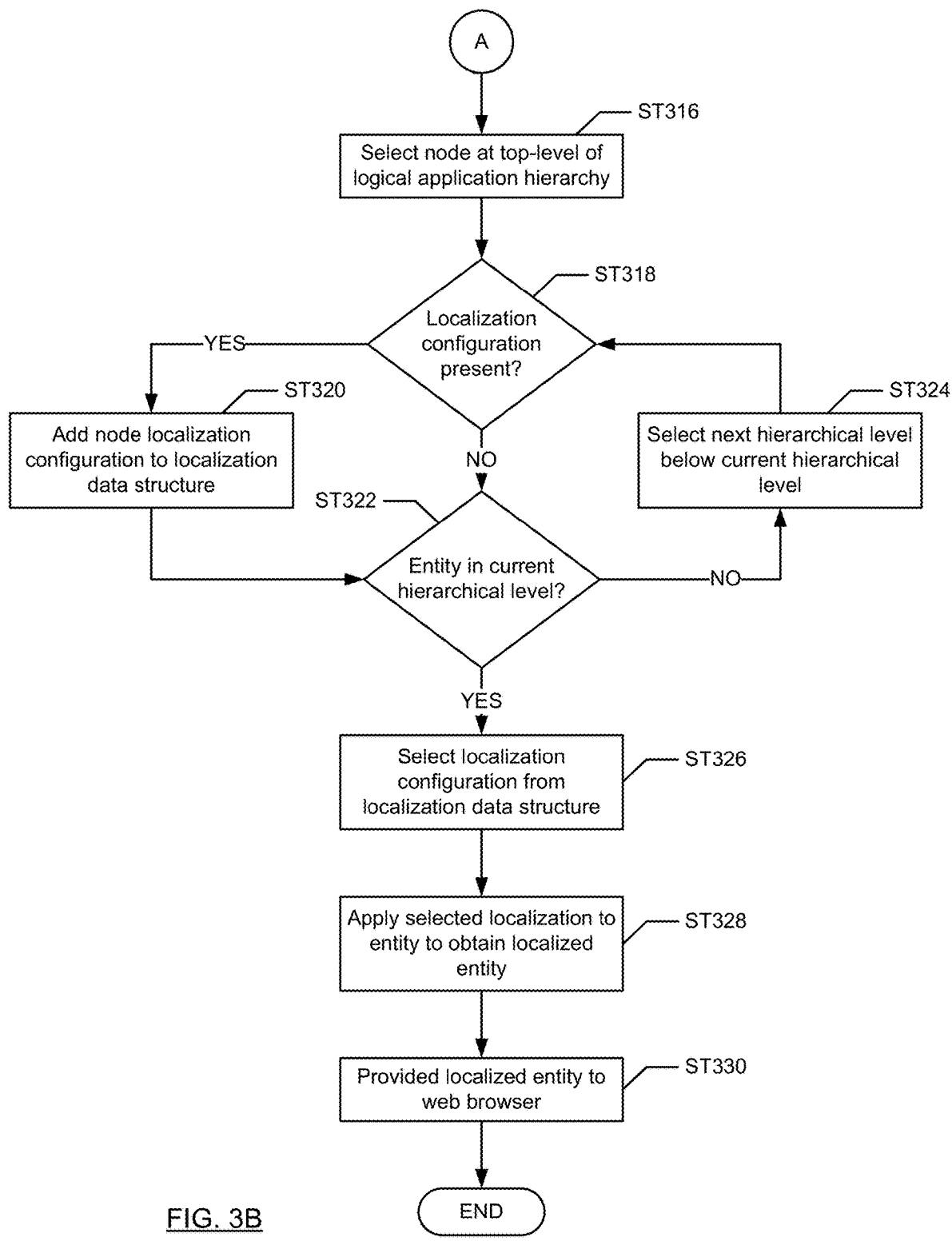

Turning to the flowcharts in FIGS. 3A and 3B, while the various steps in the flowcharts are presented and described sequentially, one of ordinary skill will appreciate that some or all of the steps may be executed in different orders, may be combined or omitted, and some or all of the steps may be executed in parallel.

FIGS. 3A-3B shows a method for displaying a webpage to a user in accordance with one or more example embodiments of the technology. The method shown in FIGS. 3A-3B may be performed by a web server and/or an embedded web server (see e.g., FIGS. 1A and 1B, respectively).

In step 300, a request is received from a user via web browser, where the request is associated with an entity. In one embodiment of the technology, an entity is associated with a request if, in response to processing a request, the entity is displayed (via the web browser) to the user. The request may be initiated by a user using any known or later discovered input mechanism (see e.g., FIG. 4). Examples of requests may include, but are not limited to, a request to transition to a new webpage in the web application, and a request to display different information on the same webpage. For example, a webpage that is currently displayed to the user (via the web browser) may include a table that includes column labels, row labels, and corresponding data. The webpage may further display a button, which when clicked by the user (e.g., using a pointer), changes the column labels, the row labels, and the corresponding data displayed in the table on the webpage. In this example, the request is generated in response to the user clicking the button.

Continuing with the discussion of FIG. 3A, in step 302, user qualifiers associated with the user are determined. More specifically, in one embodiment of the technology, the request is associated with a user, e.g., a user that is logged into the web application. The qualifiers associated with the user may correspond to one or more of the attributes described above with respect to FIG. 2C. The set of attributes associated with the user may be collectively referred to as user qualifiers. The individual attributes associated with the user may be discovered or otherwise obtained using any known or later discovered mechanism.

In step 304, the node at the top-level of the logical application hierarchy is selected. The node selected in step 304 may be referred to as the root node.

In step 306, the node qualifier for the node is obtained. In one embodiment of the technology, the node qualifier may be specified in a file (e.g., a JSON file, an XML file, etc.) that is stored in the node, where the node is a folder in the file structure.

In step 308, a determination is made about whether the user qualifier (or a portion thereof) (obtained in step 302) match the node qualifier obtained in step 306. If there is a match, then the process proceeds to step 310; if there is not a match, then the process proceeds to step 314.

In one embodiment of the technology, the user qualifier is deemed to match the node qualifier when the attribute(s) in the user qualifier match the attribute(s) listed in the node qualifier. The matching of the user qualifier to the node qualifier may be performed on a per-attribute type basis. The matching may be performed, for example, as follows: (i) identify all attributes of a given type in the node qualifier (e.g., all attributes that specify role), (ii) determine whether the user qualifier includes an attribute that matches at least one the attributes identified in (i); (iii) if there is a match in (ii), then proceed to step (i) for another un-processed attribute type in the node qualifier. If there is no match in (ii), then the remaining attribute types in the node qualifier are not processed.

For example, the user qualifier may specify: user ID, role 1, subscription 1, geography: USA, and device type: mobile device and the node qualifier may specify: role 1, role 2, role 3, subscription 1, and subscription 2. In this example, the user qualifier may be deemed to match the node qualifier because the user qualifier has: (i) a role (i.e., role 1) that matches one of the possible roles (i.e., role 1, role 1, role 3) specified in the node qualifier and (ii) a subscription (i.e., subscription 1) that matches one of the possible subscriptions (i.e., subscription 1, subscription 2).

In another example, the user qualifier may specify: user ID, role 4, subscription 1, geography: USA, and device type: mobile device and the node qualifier may specify: role 1, role 2, role 3, subscription 1, and subscription 2. In this example, the user qualifier may be deemed not to match the node qualifier because the user qualifier has: (i) a role (i.e., role 4) that does not match one of the possible roles (i.e., role 1, role 1, role 3) specified in the node. In this example, the subscription attributes in the node qualifier may not be processed once it is determined that the role attribute of the user qualifier does not match any of the role attributes in the user qualifier.

If a node qualifier is not associated with the node, then step 306 and 308 are not performed.

Continuing with the discussion of FIG. 3A, in step 310, a determination is made about whether the requested entity (i.e., the entity associated with the request received in step 300) is at the current hierarchical level within the logical application hierarchy (i.e., the hierarchical level associated the with node selected in step 304 or step 312). If the requested entity is at the current hierarchical level within the logical application hierarchy, then the process proceeds to step 316 in FIG. 3B; alternatively, the process proceeds to step 312.

In step 312, a child node of the node that is currently being processed is selected, where the selected child node is either: (i) a node in the logical application hierarchy in which the entity is located or (ii) is a node in a traversal path between current node and the node in which the entity is located. An example of the traversal path is described below with reference to FIG. 5. The process then proceeds to step 306.

In step 314, an error is returned to the user. More specifically, the web server generates an error message and then sends the error message to the device for subsequent display on the web browser. Step 314 is performed when the user which issued the request in step 300 is not permitted to view the entity that is associated with its request. The process then ends.

Referring to FIG. 3B, the method shown in FIG. 3B is performed when the user (i.e., the user that issued the request in step 300) is permitted to view the entity associated with the request. The method shown in FIG. 3B is used to determine what localization configuration to apply to the entity prior to the entity being displayed to the user (via the web browser).

In step 316, the node at the top-level of the logical application hierarchy is selected.

In step 318, a determination is made about whether the node (i.e., the node selected in step 316 or step 324) includes a node localization configuration. If the node includes a node localization configuration, the process proceeds to step 320; otherwise, the process proceeds to step 322.

In step 320, the node localization configuration is added to the localization data structure. Adding the node localization configuration may include adding all localization entries in the node localization configuration to the data structure and associating each of the added localization entries with an identifier associated with the hierarchical level and/or node within the logical application hierarchy with which they are located (or with which they are associated). (See e.g., Table 1 below). The localization data structure may be implemented using any known or later discovered data structure without departing from the technology.

In step 322, a determination is made about whether the requested entity (i.e., the entity associated with the request received in step 300) is at the current hierarchical level within the logical application hierarchy (i.e., the hierarchical level associated the with node selected in step 316 or step 324). If the requested entity is at the current hierarchical level within the logical application hierarchy, then the process proceeds to step 326; alternatively, the process proceeds to step 324.

In step 324, a child node of the node that is currently being processed is selected, where the selected child node is either: (i) a node in the logical application hierarchy in which the entity is located or (ii) is a node in a traversal path between current node and the node in which the entity is located. An example of the traversal path is described below with reference to FIG. 5. The process then proceeds to step 318.

In step 326, the localization configuration to apply to the entity is selected from the localization data structure that was populated while traversing the logical application hierarchy from its root node to the node that includes the entity. The selection of the localization configuration to apply may be determined by selecting the localization entry in the localization data structure that satisfies the following conditions: (i) the localization entry specifies a localization for the entity; (ii) the user qualifier matches the localization qualifier; (iii) the localization entry is associated with the node that includes the entity or is the node that is the closest in the logical application hierarchy to the node that includes the entity. An example of the selection of the localization configuration to apply is described below with reference to FIG. 5. The matching of the user qualifier to the localization qualifier may be performed in substantially the same manner as the matching of the user qualifier to the node qualifier described above with respect to FIG. 3A.

In step 328, the selected localization configuration is applied to the entity to obtain a localized entity. Applying the selected localization to the entity may include: (i) obtaining the entity from the web application and (ii) replacing a placeholder in the entity (e.g., a placeholder in the HTML of a webpage) with content present in the localization entry selected in step 326. Other methods for applying the localization configuration may be implemented without departing from the invention.

In step 330, the localized entity is provided to the web browser for subsequent display to the user.

Figure 4:
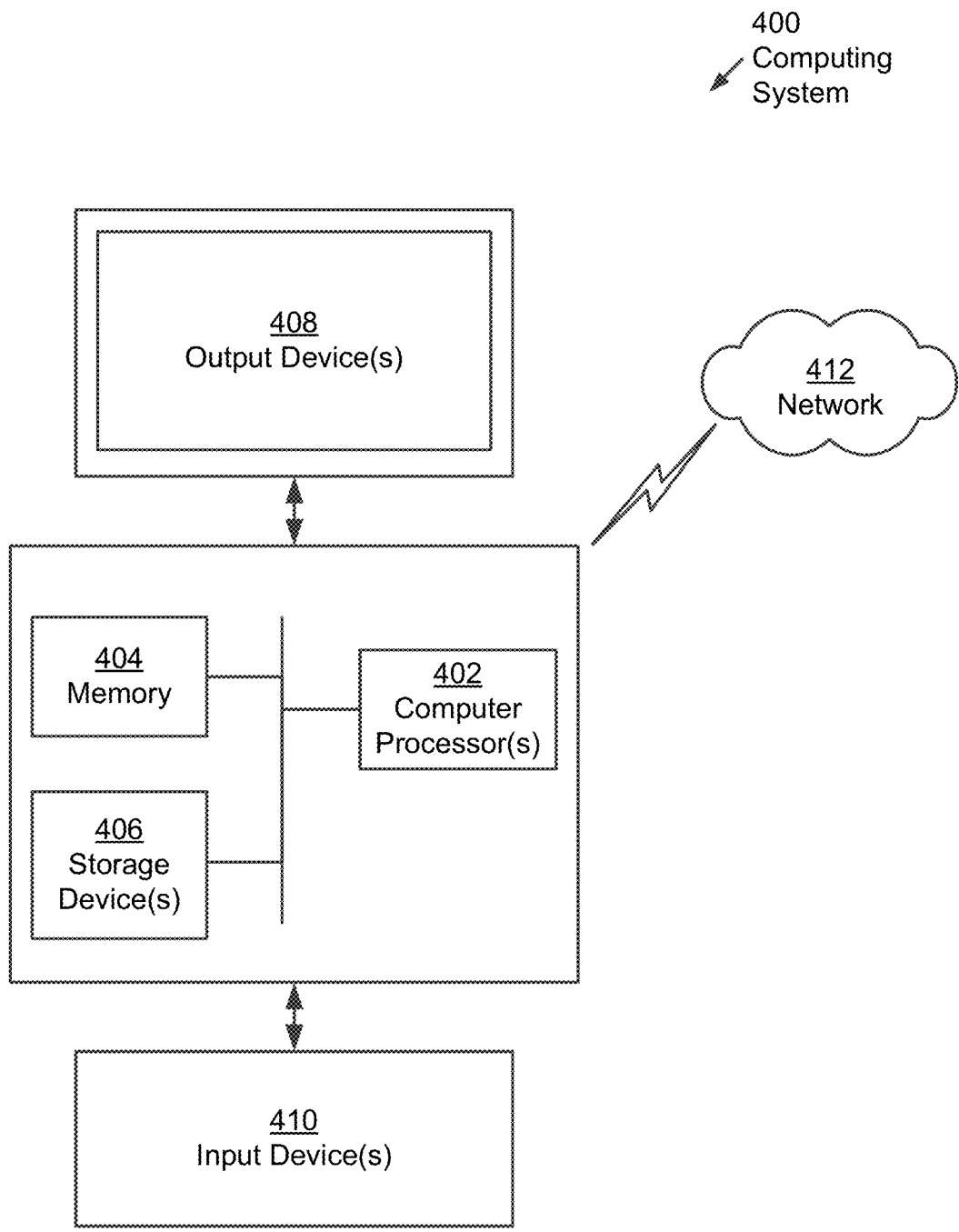
FIG. 4 shows an example computing system in accordance with one or more embodiments of the technology.

Embodiments of the technology may be implemented on a computing system. Any combination of mobile, desktop, server, embedded, or other types of hardware may be used. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code, that when executed by a processor(s), is configured to perform embodiments of the technology.

Further, one or more elements of the aforementioned computing system (400) may be located at a remote location and connected to the other elements over a network (412). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

Example

The following is a non-limiting example in accordance with one or more embodiment of the technology. Referring to FIG. 5, consider a scenario in which the web application includes source code, images, and third-party libraries (collectively referred to a files), where the files are stored the file structure shown in FIG. 5.

For purposes of this example, assume that a user issues a request to display a table of tasks on a webpage. Accordingly, in this example, the table of tasks is the entity. Further, assume that the files associated with the table of tasks is located in the "operations" node (510) within the logical application hierarchy. In order to service this request, the web server (in conjunction with the localization engine) first performs that method shown in FIG. 3A to determine whether the user may view the requested table.

As described above, in one embodiment of the technology, in order to determine whether the user can view the requested table, the web server traverses the logical application hierarchy and, at each node it encounters during the traversal, a determination is made if the user qualifier matches any node qualifier that is associated with the encountered node. If there is no node qualifier specified for the particular node, then the traversal continues. However, if there is a node qualifier for the specific node, then a matching process is performed (as described in FIG. 3A) to determine whether the user qualifier matches the node qualifier. If the user qualifier does not match the node qualifier then the process ends and an error is returned. If the user qualifier does match the node qualifier, then the traversal continues.

In the instant example, the traversal path is as follows: "columbo" node (500), "hooks" node (502), "task" node (504), "features" node (506), "taskList" node (508), and "operations" node (510). In order for the user to view the requested table (i.e., the entity in this example), the user qualifier must match any node qualifier encountered in the above traversal path. In this example, assume that there are only node qualifiers specified for columbo" node (500), "task" node (504), and "features" node (506). Accordingly, the user qualifier must all three node qualifiers in order to view the entity.

Once a determination is made that the user may view the entity, the method shown in FIG. 3B is performed in order to determine the localization configuration to apply to the entity. As discussed above in FIG. 3B, the logical application hierarchy is traversed from the root node of the logical application hierarchy to the node that includes the entity in order to populate the logical configuration data structure. In this example, the following nodes in the logical application hierarchy are encountered during the traversal: "columbo" node (500), "hooks" node (502), "task" node (504), "features" node (506), "taskList" node (508), and "operations" node (510); however, only three node localization configurations identified during the traversal: "task.json" (516) (associated with the "task" node (504), "taskList.json" (514) (associated with the "taskList" node (508), and "viewsTask.json" (512) (associated with the "operations" node (510).

The localization entries associated with each of the identified node localization configurations are added to the localization data structure. The localization data structure is then evaluated to determine which localization entry to apply to the entity to generate the localized entity.

In this example, assume the following: (i) the user is associated with Role 1 and geography 3 and (ii) the entity is associated with ID: Table 1. Further, assume that the localization data structure includes the following entries.

TABLE 1

Localization Data Structure

| Entry ID | Hierarchical Level | Entity | Localization Qualifier | Localization Content |
|---|---|---|---|---|
| 1 | task node | Table 1 | Role 1, Role 2, Geography 2 | Content A |
| 2 | task node | Table 2 | Role 2 | Content B |
| 3 | task node | Table 1 | Geography 3 | Content C |
| 4 | taskList node | Table 2 | Role 3, Geography 1 | Content D |
| 5 | taskList node | Table 2 | Role 1, Geography 1 | Content E |
| 6 | operations node | Table 1 | Role 1, Geography 2 | Content F |
| 7 | operations node | Button 1 | Role 1, Geography 1 | Content G |

As discussed above in step 326, the localization entry that satisfies the following three conditions is selected from the localization data structure: (i) entity matches requested entity; (ii) user qualifier matches localization qualifier, and (iii) the localization entry is associated with the node that includes the entity or is the node that is the closest in the logical application hierarchy to the node that includes the entity. In this example, entries 6 and 7 are processed first because they are associated with the node in which the entity is located. In this example, neither entry 6 nor 7 match three required conditions. Accordingly, entries 4 and 5 are processed next because they are associated with a node that is the direct parent of the node in which the entity is located. In this example, neither entry 4 nor 5 match three required conditions. Finally, entries 1-3 are processed. In this example, entry 3 is selected because it satisfies the three conditions listed above.

The identified localization content (i.e., content C) is subsequently used to generate the localized entity. The localized entity is then provided to the web browser, which subsequently displays the localized entity (i.e., the requested table with the appropriate localization) to the user.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for processing requests from client devices, comprising:
   displaying, through a web browser on a client device, a first webpage of a web application, wherein the first webpage comprises a plurality of entities each configured to perform one selected from a group of actions consisting of transitioning to a second webpage and changing information displayed on the first webpage;
   receiving, from the client device, a first request associated with an entity of the plurality of entities, wherein the first request is associated with a user;
   obtaining, for the user, a set of user qualifiers;
   performing a first traversal of a logical application hierarchy of the web application along a traversal path to the first entity, wherein:
      for any node encountered along the traversal path, wherein each node is not the entity:
         obtaining, for the node, a respective set of node qualifiers;
         making a determination that at least one of the set of user qualifiers matches at least one node qualifier of the respective set of node qualifiers; and
         based on the determination, proceeding along the traversal path to one selected from a group consisting of a next node and the entity; and
   after performing the first traversal:
      performing a second traversal of the traversal path to populate a localization data structure, wherein upon completion of the second traversal of the traversal path, the localization data structure comprises a first node localization configuration from a first node and a second node localization configuration from a second node, wherein the first node and the second node are on the traversal path;
   after performing the first and second traversals, applying node localization configurations from the localization data structure to the entity to obtain a localized entity;
   providing the localized entity to the client device.

2. The method of claim 1, wherein the logical application hierarchy is a file structure and each node is a folder in the file structure.

3. The method of claim 1, wherein the entity is one selected from a group consisting of a webpage, a complex object, and an object.

4. A system, comprising:
   a processor;
   physical storage storing a web application, wherein the web application is stored in a logical hierarchy within the physical storage; and
   a web server executing on the processor and programmed to:
      display, through a web browser on a client device, a first webpage of the web application, wherein the first webpage comprises a plurality of entities each configured to perform one selected from a group of actions consisting of transitioning to a second webpage and changing information displayed on the first webpage;
      receive, from the client device, a first request associated with an entity of the plurality of entities, wherein the first request is associated with a user;
      obtain, for the user, a set of user qualifiers;
      perform a first traversal of a logical application hierarchy of the web application along a traversal path to the first entity, wherein:
         for any node encountered along the traversal path, wherein each node is not the entity:
            obtain, for the node, a respective set of node qualifiers;
            make a determination that at least one of the set of user qualifiers matches at least one node qualifier of the respective set of node qualifiers; and
            based on the determination, proceed along the traversal path to one selected from a group consisting of a next node and the entity; and
      after performing the first traversal:
         perform a second traversal of the traversal path to populate a localization data structure, wherein upon completion of the second traversal of the traversal path, the localization data structure comprises a first node localization configuration from a first node and a second node localization configuration from a second node, wherein the first node and the second node are on the traversal path;

after performing the first and second traversals, apply node localization configurations from the localization data structure to the entity to obtain a localized entity;

provide the localized entity to the client device.

5. The system of claim 4, wherein the logical application hierarchy is a file structure and each node is a folder in the file structure.

6. The system of claim 4, wherein the entity is one selected from a group consisting of a webpage, a complex object, and an object.

7. A non-transitory computer readable medium comprising computer readable program code which, when executed by a computer processor, enables the computer processor to perform a method, the method comprising:

displaying, through a web browser on a client device, a first webpage of a web application, wherein the first webpage comprises a plurality of entities each configured to perform one selected from a group of actions consisting of transitioning to a second webpage and changing information displayed on the first webpage;

receiving, from the client device, a first request associated with an entity of the plurality of entities, wherein the first request is associated with a user;

obtaining, for the user, a set of user qualifiers;

performing a first traversal of a logical application hierarchy of the web application along a traversal path to the first entity, wherein:

for any node encountered along the traversal path, wherein each node is not the entity:

obtaining, for the node, a respective set of node qualifiers;

making a determination that at least one of the set of user qualifiers matches at least one node qualifier of the respective set of node qualifiers; and based on the determination, proceeding along the traversal path to one selected from a group consisting of a next node and the entity; and after performing the first traversal:

performing a second traversal of the traversal path to populate a localization data structure, wherein upon completion of the second traversal of the traversal path, the localization data structure comprises a first node localization configuration from a first node and a second node localization configuration from a second node, wherein the first node and the second node are on the traversal path;

after performing the first and second traversals, applying node localization configurations from the localization data structure to the entity to obtain a localized entity;

providing the localized entity to the client device.

8. The non-transitory computer readable medium of claim 7, wherein the logical application hierarchy is a file structure and each node is a folder in the file structure.

9. The non-transitory computer readable medium of claim 7, wherein the entity is one selected from a group consisting of a webpage, a complex object, and an object.

10. The method of claim 1, wherein the set of user qualifiers comprises a user identifier and at least one selected from a group consisting of a role, a subscription, a geographic location, a tenant, and a device type.

11. The method of claim 1, wherein each set of node qualifiers comprises at least one selected from a group consisting of a set of roles comprising the role, a set of subscriptions comprising the subscription, a set of geographic locations comprising the geographic location, a set of tenants comprising the tenant, and a set of device types comprising the device type.

12. The system of claim 4, wherein the set of user qualifiers comprises a user identifier and at least one selected from a group consisting of a role, a subscription, a geographic location, a tenant, and a device type.

13. The system of claim 4, wherein each set of node qualifiers comprises at least one selected from a group consisting of a set of roles comprising the role, a set of subscriptions comprising the subscription, a set of geographic locations comprising the geographic location, a set of tenants comprising the tenant, and a set of device types comprising the device type.

14. The non-transitory computer readable medium of claim 7, wherein the set of user qualifiers comprises a user identifier and at least one selected from a group consisting of a role, a subscription, a geographic location, a tenant, and a device type.

15. The non-transitory computer readable medium of claim 7, wherein each set of node qualifiers comprises at least one selected from a group consisting of a set of roles comprising the role, a set of subscriptions comprising the subscription, a set of geographic locations comprising the geographic location, a set of tenants comprising the tenant, and a set of device types comprising the device type.

* * * * *